United States Patent Office 2,759,819
Patented Aug. 21, 1956

2,759,819

PHOTOTHERMOGRAPHIC SUBSTANCE

Marilyn Levy, Red Bank, N. J., and Heinz Schulze, Binghamton, N. Y., assignors to the United States of America as represented by the Secretary of the Army No Drawing. Application June 29, 1954, Serial No. 440,308

1 Claim. (Cl. 95—7)

(Granted under Title 35, U. S. Code (1952), sec. 266)

The invention described herein may be manufactured and used by or for the Government for governmental purposes without the payment of any royalty thereon.

This invention relates to new photothermographic substances and to photographic layers sensitized with the new photothermographic substances.

The term "photothermographic" has been defined in U. S. Patent 2,095,839 as characterizing a material which after its exposure to light may be decomposed or modified by the action of heat differentially in accordance with the exposure to light. A photographic layer sensitized with such photothermographic substances is therefore, after exposure to light, developable by heat.

The present invention is based on the discovery that silver salts of amidoximes are valuable thermographic substances which will produce after exposure to light and subsequent to heat treatment a visble record of the incident light.

The invention will become more apparent from the description of several embodiments of the broad inventive idea.

EXAMPLE

1. *Preparation of succinamidoxime*

Dissolve 22 grams of hydroxylamine hydrochloride in 25 ml. of water and add 12.6 grams lithium hydroxide with agitation. When the temperature of the solution reaches approximately 40° C., 8 ml. of melted succinonitrile is added and the temperature of the solution is kept constant, by means of an ice bath, between 60–65° C. until there is no further heat development. The mixture is allowed to cool to room temperature, and the precipitated oxime is filtered and washed with ice water. The oxime is then recrystallized from a 50/50 methanol-water mixture and a white crystalline product is obtained which is believed to be succindiamidoxime.

2. *Preparation of silver succindiamidoxime*

Dissolve 5.8 grams of the material (succindiamidoxime) obtained as described above in 200 ml. of water on a steam bath. Cool the solution to 40° and add it rapidly to 60 ml. of a 1 normal solution of silver nitrate in water, with agitation over ice water. A fine white precipitate appears almost immediately. The mixture is allowed to cool for about five minutes in ice water and then filtered through a rapid filter paper, washed about ten times with ice water and dried over night in a vacuum desiccator over calcium chloride. The precipitate is then ground in an agate mortar. The dried powder has excellent storage stability in the dark, and even after one year's storage no discoloration was observed.

3. *Preparation of gelatin emulsion of silver succindiamidoxime*

Add 5 ml. of a 3 percent gelatin solution at 40° C. to 1.5 grams of dried silver succindiamidoxime in a dried container with agitation. When the silver salt is thoroughly wetted, 25 ml. of a gelatin solution (3 percent at 40° C.) is added to the above mixture. The emulsion formed, is then passed through a warmed, stainless steel, hand homogenizer and coated on clean glass slides. These slides were exposed to a light source and thermal development was carried out by placing the plate, emulsion-side up, in a nichrome-wound aluminum block oven at 102° C. for about four minutes.

The light sensitivity of silver succindiamidoximes depends on the following factors:

(a) Variation of ratio of silver nitrate ($AgNO_3$) to succindiamidoxime in the preparation of the silver salt.

Silver salts were prepared containing 1 mole, 1½ moles, 2 moles and 2½ moles, of $AgNO_3$ to 1 mole of succindiamidoxime and it was found that the light sensitivity increases with increased $AgNO_3$, although the change is not substantial.

(b) Type of gelatin used to disperse the silver salt. Inert, moderately inert, moderately active and active grades of gelatin were used as a dispersing medium for the silver salt of succindiamidoxime. It was found that the greatest sensitivity was exhibited by films using the inert gelatin as a carrier and poorest sensitivity using the active gelatin. The remaining gelatins gave intermediate values between these two extremes.

(c) Variation in the ratio of silver salt to gelatin in the emulsions. The light sensitivity increases with increased ratio of silver salt to gelatin. Optimum conditions of light and heat development were obtained using the ratios prescribed in the directions given previously for the preparation of gelatin emulsions of silver succindiamidoxime.

The photothermographic substances according to the invention may be dispersed in any suitable colloidal carrier to produce a photothermographic layer on one of the conventional supports. The material for the photographic layer may consist of gelatin, ceasin, agar, and various natural or synthetic high polymers such as the already mentioned polystyrene or phenol formaldehyde resins, vinyl resins, alkyd resins, etc. The support for the photographic layer may be a plate of any of the commonly used materials such as glass, paper, cellulose derivitives, etc.

It will be obvious to those skilled in the art that a great many variations and combinations of the described processes are possible within the broad inventive idea as characterized in the appended claim.

What is claimed is:

A photothermographic element comprising a support and a photothermographic layer, said layer comprising an organic colloid carrier having dispersed therein silver succindiamidoxime.

References Cited in the file of this patent

UNITED STATES PATENTS 1,976,302   Sheppard et al. _____ Oct. 9, 1934